US010935442B2

(12) United States Patent
Jang et al.

(10) Patent No.: US 10,935,442 B2
(45) Date of Patent: Mar. 2, 2021

(54) PAIN DETECTION METHOD AND ELECTRONIC DEVICE THEREFOR

(71) Applicant: Daegu Gyeongbuk Institute of Science and Technology, Daegu (KR)

(72) Inventors: Jae Eun Jang, Daegu (KR); Minkyung Sim, Gyeongsangnam-do (KR); Kwon Sik Shin, Chungcheongnam-do (KR); Ji-Woong Choi, Daegu (KR); Cheil Moon, Daegu (KR); Hongsoo Choi, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 203 days.

(21) Appl. No.: 16/331,007

(22) PCT Filed: Sep. 8, 2016

(86) PCT No.: PCT/KR2016/010048
§ 371 (c)(1),
(2) Date: Mar. 6, 2019

(87) PCT Pub. No.: WO2018/047992
PCT Pub. Date: Mar. 15, 2018

(65) Prior Publication Data
US 2019/0187007 A1    Jun. 20, 2019

(30) Foreign Application Priority Data
Sep. 6, 2016    (KR) .................. 10-2016-0114456

(51) Int. Cl.
*G01K 13/00*    (2006.01)
*B25J 13/08*    (2006.01)
(Continued)

(52) U.S. Cl.
CPC ............ *G01K 13/00* (2013.01); *B25J 13/081* (2013.01); *B25J 13/087* (2013.01); *G01K 7/04* (2013.01); *G01L 1/16* (2013.01); *G01L 5/0038* (2013.01)

(58) Field of Classification Search
CPC ....... B25J 13/081; B25J 13/087; G01K 13/00; G01K 7/04; G01L 1/16; G01L 5/0038; G01L 5/167
See application file for complete search history.

(56) References Cited

U.S. PATENT DOCUMENTS 6,168,569 B1 * 1/2001 McEwen ................. A61B 5/16
                                                        600/557
8,417,308 B2 * 4/2013 Sethi ................. A61B 5/14551
                                                        600/324
(Continued)

FOREIGN PATENT DOCUMENTS

CN          204207751 U      3/2015
KR      10-2011-0047860      5/2011
(Continued)

OTHER PUBLICATIONS

Office Action for Korean Patent Application No. 10-2016-0114456 dated Sep. 28, 2017; 5 pages.
(Continued)

*Primary Examiner* — Francis C Gray
(74) *Attorney, Agent, or Firm* — Hauptman Ham, LLP

(57) ABSTRACT

Provided is a pain detecting method including obtaining an electric signal from applied pressure and heat by using a sensor unit including a material exhibiting both the piezoelectric characteristic and the thermoelectric characteristic; separating a pressure signal generated by the pressure and a heat signal generated by the heat from the obtained electric signal; determining whether to generate pain data from each
(Continued)

of the pressure signal and the heat signal; and outputting the pain data.

20 Claims, 14 Drawing Sheets

(51) Int. Cl.
   *G01K 7/04* (2006.01)
   *G01L 1/16* (2006.01)
   *G01L 5/00* (2006.01)

(56) References Cited

U.S. PATENT DOCUMENTS

| | | | |
|---|---|---|---|
| 8,764,650 B2 * | 7/2014 | Schiavenato | G16H 40/63 |
| | | | 600/300 |
| 8,858,433 B2 * | 10/2014 | Sethi | A61B 5/14551 |
| | | | 600/301 |
| 2003/0204148 A1 * | 10/2003 | Lange | A61B 5/4824 |
| | | | 600/544 |
| 2011/0101315 A1 | 5/2011 | Choi et al. | |
| 2013/0238129 A1 | 9/2013 | Rose et al. | |
| 2013/0278536 A1 | 10/2013 | Nakamura et al. | |
| 2014/0174496 A1 | 6/2014 | Park et al. | |
| 2017/0164876 A1 * | 6/2017 | Hyde | A61B 5/0402 |

FOREIGN PATENT DOCUMENTS

| | | |
|---|---|---|
| KR | 10-2014-0081630 | 7/2014 |
| WO | WO 2012/086208 A1 | 6/2012 |

OTHER PUBLICATIONS

Notice of Allowance for Korean Patent Application No. 10-2016-114456 dated Jun. 5, 2018; 3 pages.

* cited by examiner

PAIN DETECTION METHOD AND ELECTRONIC DEVICE THEREFOR

CROSS-REFERENCE TO RELATED APPLICATION(S)

This application is a national stage application under 35 U.S.C. § 371 of International Patent Application No. PCT/KR2016/010048, filed on Sep. 8, 2016, which claims priority to Korean Patent Application No. 10-2016-0114456, filed on Sep. 6, 2016, the entirety of all of which are incorporated by reference herein.

TECHNICAL FIELD

The present disclosure relates to a pain detection method for detecting pain caused by external stimuli and an electronic device for the same.

BACKGROUND

As the efforts to apply human senses including vision, hearing, olfactory sense, taste, and tactile sense to machines have been made for a long time, sensor development technology related thereto has been diversified and developed. Recently, as the technology for developing smartphones or wearable computers is developed, a method of transmitting interaction by tactile sense has become an important means in the interaction between human and machine.

In the case of robots, unlike robots in the past that only performed repetitive tasks in the manufacturing field, robotic manufacturing technology has become more sophisticated and delicate, and thus robots are being more utilized in various fields like medical care, defense, and industry. Therefore, the importance of tactile sense to be applied to robot fingers is becoming more and more important. In order to give tactile sense to a machine, an ideal tactile sensor that imitates the human skin instead of a simple touch recognition is being studied.

DESCRIPTION OF EMBODIMENTS

Technical Problem

However, the conventional research on tactile sensors have been mainly carried out to improve the precision of detection and the flexibility of the tactile sensors. Also, researches on robots capable of mutually interacting with human have been carried out by storing data in which languages, speech tones, and faces are matched to corresponding emotions, detecting a speech or a face of the human via an auditory sensor and a visual sensor, and outputting a corresponding emotion.

The present disclosure provides a pain detection method capable of measuring "pain caused by pressure" and "pain caused by heat" simultaneously via one sensor unit by using physical characteristics of the sensor unit and electronic devices for detecting pain.

However, these problems are illustrative, and thus the scope of the present disclosure is not limited thereto.

Solution to Problem

According to an aspect of the present disclosure, there is provided a pain detecting method including obtaining an electric signal from applied pressure and heat by using a sensor unit comprising a material exhibiting both the piezoelectric characteristic and the thermoelectric characteristic; separating a pressure signal generated by the pressure and a heat signal generated by the heat from the obtained electric signal; determining whether to generate pain data from each of the pressure signal and the heat signal; and outputting the pain data.

According to another aspect of the present disclosure, there is provided an electronic device including a sensor unit comprising a material exhibiting the piezoelectric characteristic and the thermoelectric characteristic; a control unit configured to generate pain data from an electric signal obtained from the sensor unit; and an output unit configured to output the pain data, wherein the control unit includes a signal separating unit configured to separate a pressure signal generated by the pressure and a heat signal generated by the heat from the obtained electric signal; a comparing and determining unit configured to determine whether to generate pain data from each of the pressure signal and the heat signal; and a pain data generating unit configured to generate pain data.

Advantageous Effects of Disclosure

According to embodiments of the present disclosure as described above, a pain detection method capable of measuring "pain caused by pressure" and "pain caused by heat" simultaneously via one sensor unit by using physical characteristics of the sensor unit and electronic devices for detecting pain may be provided. In addition, electronic devices capable of interacting with the human by detecting pain and protecting themselves in response to the pain may be implemented.

Of course, the scope of the present disclosure is not limited by these effects.

DETAILED DESCRIPTION

Figure 1:
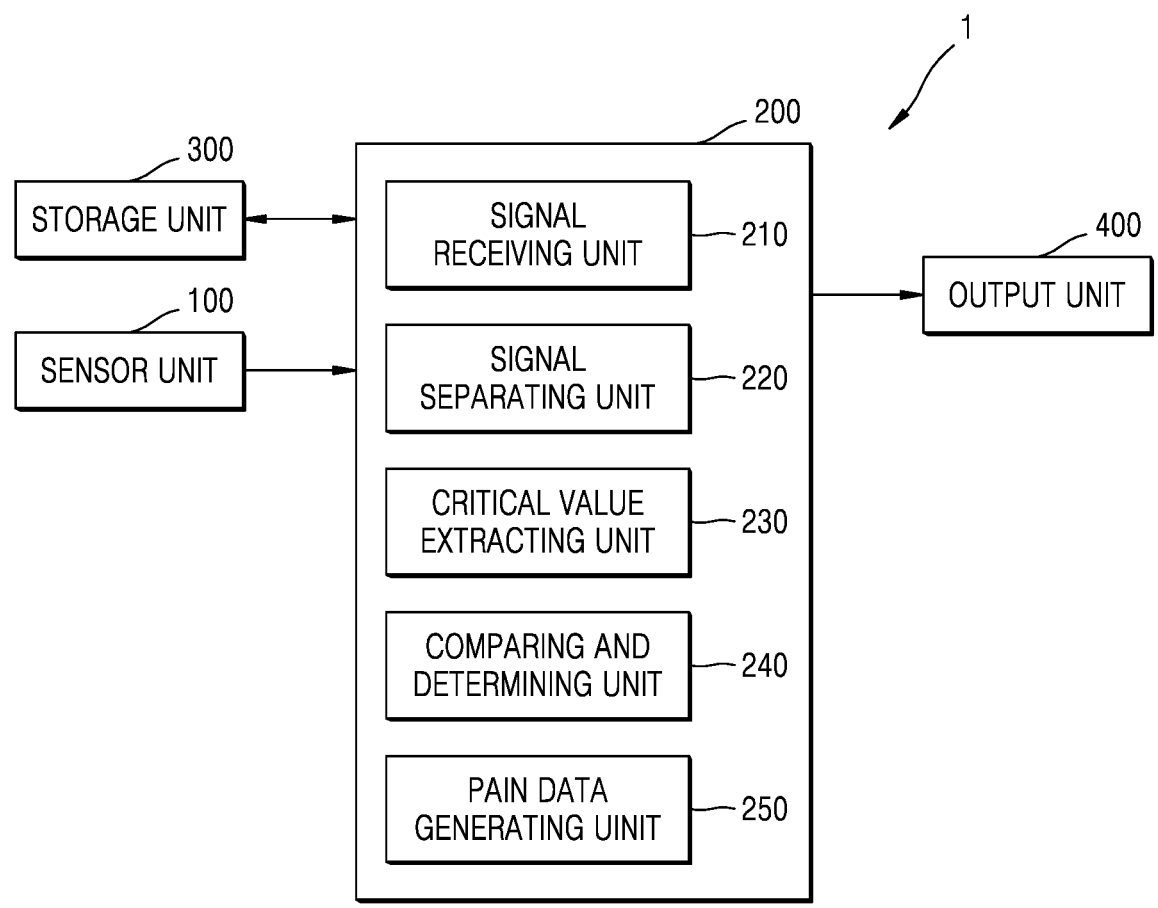
FIG. 1 is a block diagram showing a configuration of an electronic device for detecting pain according to an embodiment.

According to an embodiment, there is provided a pain detecting method including obtaining an electric signal from applied pressure and heat by using a sensor unit comprising a material exhibiting both the piezoelectric characteristic and the thermoelectric characteristic; separating a pressure signal generated by the pressure and a heat signal generated by the heat from the obtained electric signal; determining whether to generate pain data from each of the pressure signal and the heat signal; and outputting the pain data.

The sensor unit is a sensor array including a plurality of sensors arranged in a matrix shape, and the determining of whether to generate the pain data may include determining whether to generate pain data based on the number of sensors generating signals from among the plurality of sensors and the intensity of the pressure signal; and determining whether to generate pain data from the heat based on the intensity of the heat signal.

In the determining of whether to generate the pain data, the pressure signal may be determined as first pain data when the number of the sensors is equal to or less than a critical number and the intensity of the pressure signal is equal to or greater than a first critical intensity and the pressure signal may be determined as second pain data when the number of the sensors exceeds the critical number and the intensity of the pressure signal is equal to or greater than a second critical intensity, and, in the determining of whether to generate pain data from the heat, the heat signal generated by at least one of the plurality of sensors may be determined as third pain data when the heat signal is equal to or greater than a third critical intensity.

The second critical intensity may be greater than the first critical intensity.

The output unit may include at least one of a voice output unit, a display unit, and a driving motor and may output at least one of the first pain data, the second pain data, and the third pain data.

Each of the plurality of sensors may include a first electrode, a second electrode facing the first electrode, and an intermediate layer disposed between the first electrode and the second electrode, the intermediate layer including a material exhibiting both the piezoelectric characteristic and the thermoelectric characteristic.

The material exhibiting both the piezoelectric characteristic and the thermoelectric characteristic may be an insulating piezoelectric material including polyvinylidene fluoride (PVDF), barium titanate ($BaTiO_3$), lead zirconate titanate (PZT), lead titanate ($PbTiO_3$), strontium titanate ($SrTiO_3$).

In the separating of the pressure signal and the heat signal, the obtained electric signal may be classified into the pressure signal when the obtained electric signal is 0 or greater, may be classified into the heat signal when the obtained electric signal is smaller than 0 or classifies the obtained electric signal into the pressure signal when the obtained electric signal is 0 or smaller, and may be classified into the heat signal when the obtained electric signal is greater than 0.

The material exhibiting both the piezoelectric characteristic and the thermoelectric characteristic may include a semiconductor piezoelectric material including conductive carriers, and the semiconductor piezoelectric material may constitute a zinc oxide (ZnO) film or a zinc oxide nanowire.

In the separating of the pressure signal and the heat signal, the electric signal may be classified into a heat signal when the intensity of the electric signal is greater than 0 and the number of points at which differential values of the electric signal with respect to the time is equal to or greater than a first critical number and the electric signal may be classified into a pressure signal when the number of points at which differential values of the electric signal with respect to the time is smaller than the first critical number.

According to another embodiment of the present disclosure, there is provided an electronic device including a sensor unit comprising a material exhibiting the piezoelectric characteristic and the thermoelectric characteristic; a control unit configured to generate pain data from an electric signal obtained from the sensor unit; and an output unit configured to output the pain data, wherein the control unit includes a signal separating unit configured to separate a pressure signal generated by the pressure and a heat signal generated by the heat from the obtained electric signal; a comparing and determining unit configured to determine whether to generate pain data from each of the pressure signal and the heat signal; and a pain data generating unit configured to generate pain data.

The sensor unit is a sensor array including a plurality of sensors arranged in a matrix shape, and the comparing and determining unit may determine whether to generate pain data based on the number of sensors generating signals from among the plurality of sensors and the intensity of the pressure signal and determine whether to generate pain data from the heat based on the intensity of the heat signal.

The comparing and determining unit may determine the pressure signal as first pain data when the number of the sensors is equal to or less than a critical number and the intensity of the pressure signal is equal to or greater than a first critical intensity, determine the pressure signal as second pain data when the number of the sensors exceeds the critical number and the intensity of the pressure signal is equal to or greater than a second critical intensity, and determine the heat signal generated by at least one of the plurality of sensors as third pain data when the heat signal is equal to or greater than a third critical intensity.

The second critical intensity may be greater than the first critical intensity.

The output unit may include at least one of a voice output unit, a display unit, and a driving motor and may output at least one of the first pain data, the second pain data, and the third pain data.

Each of the plurality of sensors may include a first electrode, a second electrode facing the first electrode, and an intermediate layer disposed between the first electrode and the second electrode, the intermediate layer including a material exhibiting both the piezoelectric characteristic and the thermoelectric characteristic.

The material exhibiting both the piezoelectric characteristic and the thermoelectric characteristic may be an insulating piezoelectric material including polyvinylidene fluoride (PVDF), barium titanate ($BaTiO_3$), lead zirconate titanate (PZT), lead titanate ($PbTiO_3$), strontium titanate ($SrTiO_3$).

The separating and determining unit may classify the obtained electric signal into the pressure signal when the obtained electric signal is 0 or greater and classify the obtained electric signal into the heat signal when the obtained electric signal is smaller than 0 or may classify the obtained electric signal into the pressure signal when the obtained electric signal is 0 or smaller and classify the obtained electric signal into the heat signal when the obtained electric signal is greater than 0.

The material exhibiting both the piezoelectric characteristic and the thermoelectric characteristic may include a semiconductor piezoelectric material including conductive carriers, and the semiconductor piezoelectric material may constitute a zinc oxide (ZnO) film or a zinc oxide nanowire.

The separating and determining unit may classify the electric signal into a heat signal when the intensity of the electric signal is greater than 0 and the number of points at which differential values of the electric signal with respect to the time is equal to or greater than a first critical number and may classify the electric signal into a pressure signal when the number of points at which differential values of the electric signal with respect to the time is smaller than the first critical number.

The terms used in this specification will be briefly described, and the present invention will be described in detail.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, the appearance of new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and may be implemented by hardware components or software components and combinations thereof.

Hereinafter, exemplary embodiments of the present invention will be described in detail with reference to the accompanying drawings. The disclosure may, however, be embodied in many different forms and should not be construed as limited to the embodiments set forth herein. In order to clearly illustrate the disclosure, parts not related to the description are omitted, and like parts are denoted by like reference numerals throughout the specification.

FIG. 1 is a block diagram showing a configuration of an electronic device for detecting pain according to an embodiment.

As shown in FIG. 1, an electronic device 1 for detecting pain according to an embodiment may include a sensor unit 100, a control unit 200, a storage unit 300, and an output unit 400. However, not all of the components shown in FIG. 1 are required components. The electronic device 1 may be implemented by more components than the components shown in FIG. 1, or the electronic device 1 may be implemented by fewer components than the components shown in FIG. 1.

The sensor unit 100 includes a material exhibiting both a piezoelectric effect that converts applied pressure into an electric signal and a thermoelectric effect that converts applied heat into an electric signal, and thus electric signals may be obtained from pressure and heat applied to the sensor unit 100 by using the sensor unit 100. Here, obtaining electric signals by pressure and heat means that an electric signal is obtained from pressure when only pressure is applied to the sensor unit 100, an electric signal is obtained from heat when only heat is applied to the sensor unit 100, and electric signals are obtained from pressure and heat when pressure and heat are applied to the sensor unit 100. In other words, the terms pressure and heat below may refer to pressure and/or heat. A specific embodiment of the sensor unit 100 will be described later.

The control unit 200 may provide means for obtaining and processing a circuit current and data (□ OK) inside the electronic device 1 and may be implemented as hardware, software, or a combination of hardware and software.

According to an embodiment, the control unit 200 includes a signal receiving unit 210, a signal separating unit 220, a critical value extracting unit 230, a comparing and determining unit 240, and a pain data generating unit 250. The signal receiving unit 210 receives an electric signal, which is obtained by the sensor unit 100 from pressure and heat, from the sensor unit 100, and the signal separating unit 220 separates the received electric signal into a pressure signal and a heat signal.

Since the sensor unit 100 includes a material having a property of converting pressure and heat applied thereto into electric signals, both pressure and heat may be measured by using one sensor unit 100. However, electric signals obtained from the sensor unit 100 may include both an electric signal due to pressure and an electric signal due to heat.

Pain caused by pressure and pain caused by heat have different characteristics, and, when pressure and heat are applied, critical intensities of signals and outputs corresponding thereto for determining the pressure and the heat as pain may differ. The electronic device 1 according to an embodiment includes the signal separating unit 220 for separating obtained electric signals into an electric signal due to pressure and an electric signal due to heat. Electric signals received by the signal receiving unit 210 may be separated into a pressure signal and a heat signal, and separate signal processing operations may be performed thereto.

The control unit 200 includes a critical value extracting unit 230, and the critical value extracting unit 230 may extract at least one of critical values, such as a first critical number, a second critical number, a first critical intensity, a second critical intensity, and third critical intensity, stored in the storage unit 300. Critical values stored in the storage unit 300 are pre-set values and may be values input by a user in consideration of the type of the sensor unit 100, the purpose of the electronic device 1, etc. The storage unit 300 may store a program for processing operations and controlling operations of the control unit 200 in addition to the critical values and may store input/output data (e.g., voice data, image data, drive data, etc.).

The storage unit 300 may include at least one of various types of storage media including a flash memory, a hard disk, a multimedia card micro, a card type memory (e.g., an SD memory or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and/or an optical disk. In addition, the electronic device 1 may operate a web storage or a cloud server that performs a storage function of the storage unit 300 on the Internet.

The control unit 200 includes the comparing and determining unit 240, and the comparing and determining unit 240 may compare each of a pressure signal and a heat signal with at least one of critical values extracted by the critical value extracting unit 230, thereby determining whether pressure and heat applied to the sensor unit 100 correspond to "pain". A specific embodiment of the comparing and determining unit 240 will be described below.

The control unit 200 includes a pain data generating unit 250, and the pain data generating unit 250 may generate pain data when the comparing and determining unit 240 determines that pressure or heat correspond to "pain".

The electronic device 1 according to an embodiment includes the output unit 400. The control unit 200 may convert generated pain data into various types of output data or transmit the generated pain data to the output unit 400 by using output data stored in the storage unit 300, and the output unit 400 may output output data corresponding to pain data. Hereinafter, outputting of pain data by the output unit 400 may be understood as that the output unit 400 outputs output data corresponding to the pain data. The output unit 400 may include an audio output unit, a display unit, and/or a driving motor. The output unit 400 may express or warn pain through a voice or a screen image when pain data is generated and may move the electronic device 1 away from pressure and heat by moving at least a portion of the electronic device 1 by using a driving motor.

Although not shown, the control unit 200 may further include a communication unit capable of connecting the electronic device 1 to an external device via a wire or wirelessly. For example, the communication unit may include a short-range communication unit, a mobile communication unit, and/or a long-range communication unit.

Figure 2:
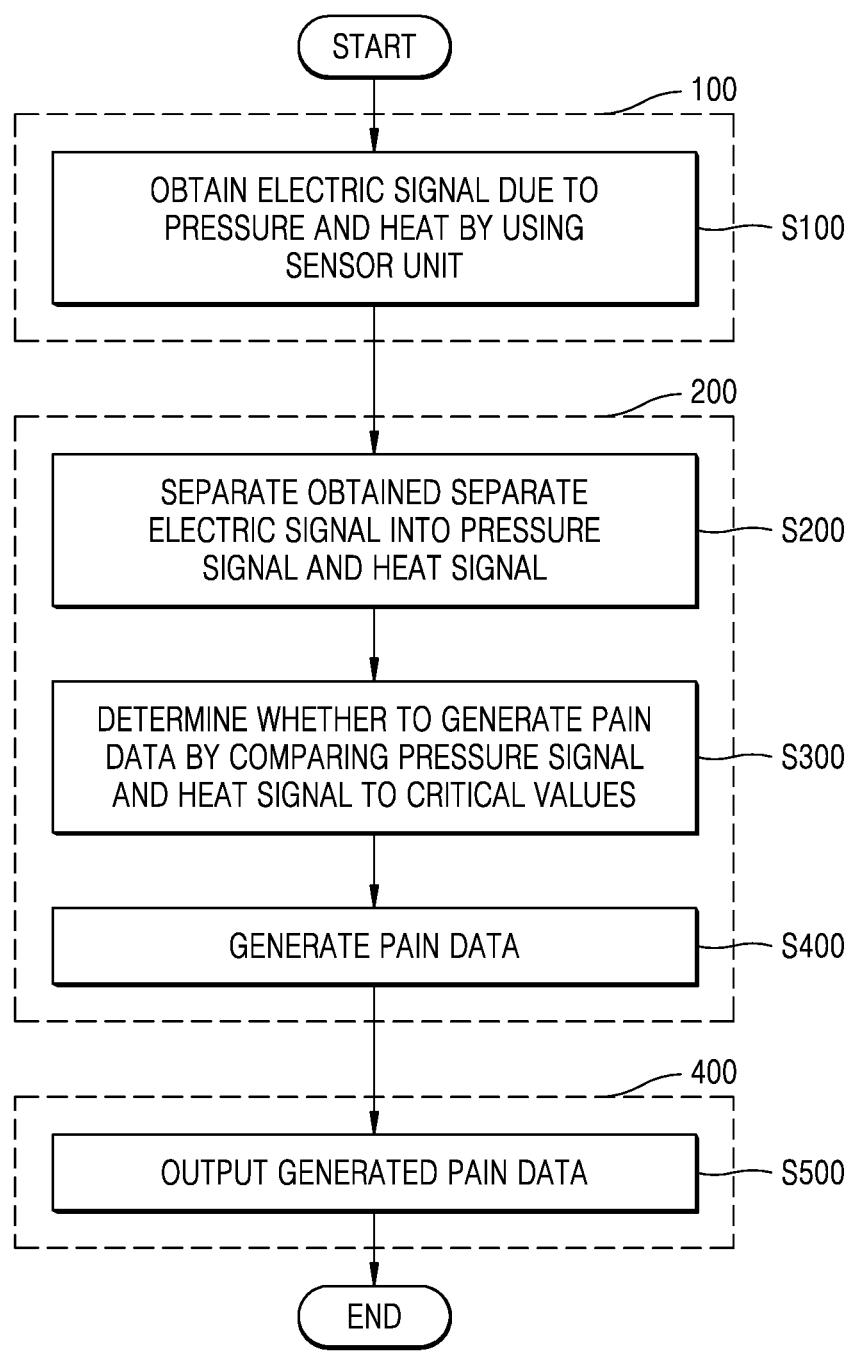
FIG. 2 is a flowchart of a pain detection method according to an embodiment.

FIG. 2 is a flowchart of a pain detection method according to an embodiment.

As shown in FIG. 2, the pain detection method according to an embodiment includes obtaining electric signals due to pressure and heat by using the sensor unit 100 (operation S100), separating obtained electric signals into a pressure signal and a heat signal (operation S200), determining whether to generate pain data by comparing the pressure signal and the heat signal with critical values (operation S300), generating pain data (operation S400), and outputting generated pain data (operation S500).

In operation S100, electric signals due to pressure and heat may be obtained by using the sensor unit 100 including a material that exhibits both the piezoelectric characteristic and the thermoelectric characteristic. When pressure and heat are applied to the sensor unit 100, the sensor unit 100 generates corresponding electric signals, and the generated electric signals may include both an electric signal due to pressure and an electric signal due to heat.

In operation S200, the obtained electric signals may be separated into a pressure signal and a heat signal. As described above, the electric signals obtained by the sensor unit 100 may include both an electric signal due to pressure and an electric signal due to heat. In operation S200, the electric signals may be separated by using a predetermined technique. Specific examples of a separation technique will be described below.

In operation S300, the pressure signal and the heat signal may be compared with critical values and determine whether to generate pain data. For example, critical values respectively corresponding to the pressure signal and the heat signal may be pre-set values stored in the storage unit 300.

When it is determined to generate pain data for at least one of the pressure signal and the heat signal in operation S300, pain data may be generated in operation S400.

In operation S500, the generated pain data may be output by the output unit 400 in various forms.

Figure 3:
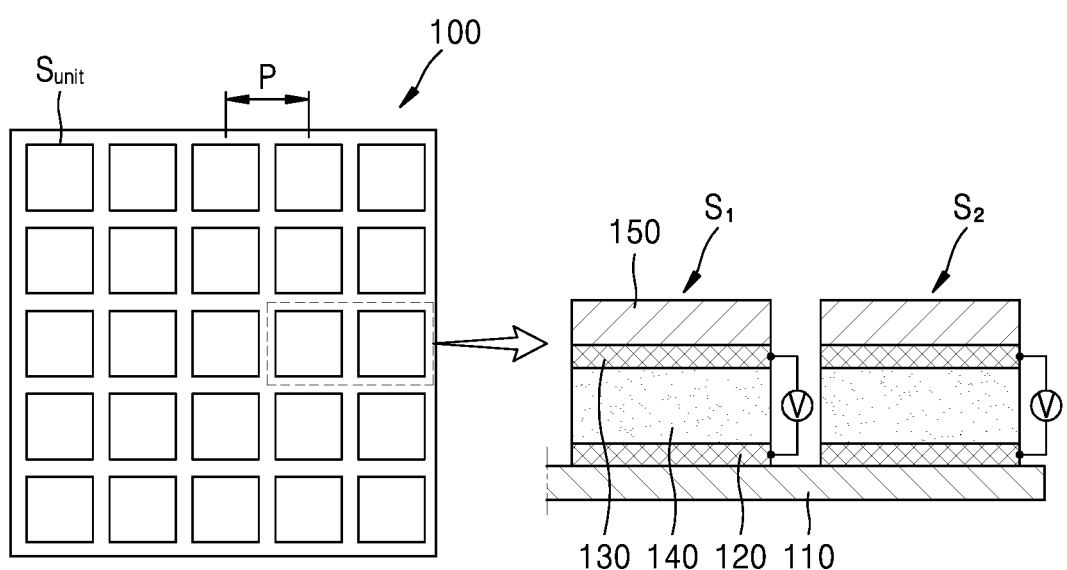
FIG. 3 is a plan view and a partial cross-sectional view schematically showing a configuration of the sensor unit of FIG. 1 according to an embodiment.

FIG. 3 is a plan view and a partial cross-sectional view schematically showing a configuration of the sensor unit of FIG. 1 according to an embodiment.

Referring to FIG. 3, the sensor unit 100 according to an embodiment may be a sensor array including a plurality of sensors $S_{unit}$. The plurality of sensors $S_{unit}$ may constitute a 2-dimensional sensor array arranged at a substantially constant interval P in a matrix shape. For example, the interval P may be from dozens of micrometers to several millimeters.

Each of sensors $S_1$ and $S_2$ of the plurality of sensors $S_{unit}$ may include a first electrode 120 and a second electrode 130 facing each other and an intermediate layer 140, which is interposed between the first electrode 120 and the second electrode 130 and includes a material exhibiting both the piezoelectric characteristic and the thermoelectric characteristic. The plurality of sensors $S_{unit}$ may be disposed on a supporting substrate 110, a cover substrate 150 including an insulation material may be disposed on the second electrode 130, and both the supporting substrate 110 and the cover substrate 150 may include a material having flexibility.

The first electrode 120 and the second electrode 130 may be transparent conductive films including indium tin oxide (ITO), for example. However, the present disclosure is not limited thereto. In other words, the first electrode 120 and the second electrode 130 may include various types of conductive materials and may include different materials.

Although FIG. 3 shows that the first electrode 120, the second electrode 130, and the intermediate layer 140 included in each of the sensors $S_1$ and $S_2$ are separated from one another, the present disclosure is not limited thereto. For example, one of the first electrode 120 and the second electrode 130 may not be separated from each other and may be integrated with each other throughout the plurality of sensors $S_{unit}$. The intermediate layer 140 may also be integrated with each other throughout the plurality of sensors $S_{unit}$.

Materials exhibiting both the piezoelectric characteristic and the thermoelectric characteristic may be roughly divided into two types. According to an embodiment, the intermediate layer 140 includes a material that exhibits both a piezoelectric effect that generates an electric signal due to electric polarization occurring when mechanical pressure is applied and a pyroelectric effect that generates an electric signal due to electric polarization caused by a temperature change of the intermediate layer 140. For example, the material may include an insulating piezoelectric material like polyvinylidene fluoride (PVDF), barium titanate (BaTiO$_3$), lead zirconate titanate (PZT), lead titanate (PbTiO$_3$), strontium titanate (SrTiO$_3$), etc.

When electric polarization occurs at the intermediate layer 140 due to pressure and/or heat, a potential difference occurs between the first electrode 120 and the second electrode 130 disposed at both ends of the intermediate layer 140, and a current may flow when the first electrode 120 and the second electrode 130 are connected to each other (□ OK), wherein a current or a voltage may be measured by using a current meter or a voltage meter. A measured electric signal is transmitted to the control unit 200 (FIG. 1), and the signal receiving unit 210 (FIG. 1) of the control unit 200 may receive such an electric signal. The intensity of an electric signal may be increased as the intensities of pressure and heat are increased. An electric signal due to pressure and heat is generated only when pressure is applied or released and when heat is applied or removed. While pressure and heat are being applied, an electric signal may not be generated.

In the case of such a material, electric signals having opposite phases are generated respectively for the case where the material is contracted by pressure and the case where the material is expanded by heat, and a pressure signal due to pressure and a heat signal due to heat may be separated from an electric signal based on the phase difference. Detailed description thereof will be given below.

According to an embodiment, the intermediate layer 140 including a material exhibiting both the piezoelectric effect and the thermoelectric effect includes a material that exhibits both the piezoelectric effect and the Seeback effect for generating an electric signal as conductive carriers existing in the material are moved by heat. For example, the material may include a semiconductor piezoelectric material like a zinc oxide (ZnO) film or a ZnO nanowire.

In order to obtain an electric signal due to applied heat, the concentration of conductive carriers needs to be higher than a predetermined value. In order to increase the concentration of conductive carriers in a semiconductor material (e.g., zinc oxide), conductive carriers may be formed by doping an impurity, forming a defect during formation of the semiconductor material, or diffusing a material constituting the first electrode 120 or the second electrode 130. When the intermediate layer 140 includes nanowires, a seed layer (not shown) for growing the nanowires and a capping layer (not shown) for supporting the nanowires and filling spaces between the nanowires may be further disposed on the first electrode 120.

In the case of such a material, while electric signals due to pressure are generated only when pressure is applied or released, electric signals are generated not only when heat is applied (that is, when a temperature is changed), but also when heat is being applied without a temperature change. Therefore, electric signals due to pressure and electric signals due to heat may be in different forms. Based on the difference, a pressure signal and a heat signal may be separated.

Figure 4:
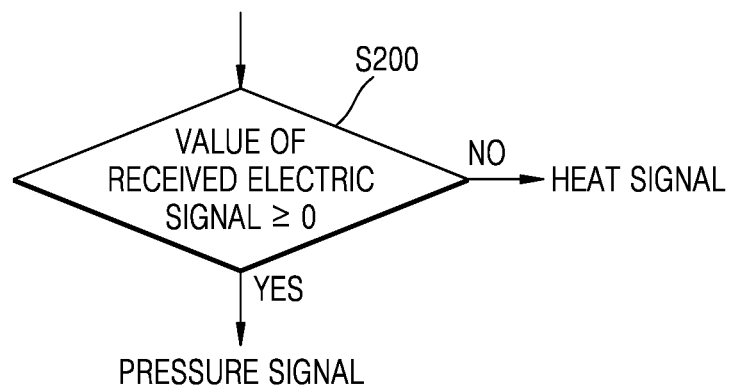
FIG. 4 is a diagram showing a method of separating an obtained electric signal into a pressure signal and a heat signal according to an embodiment.
Figure 5:
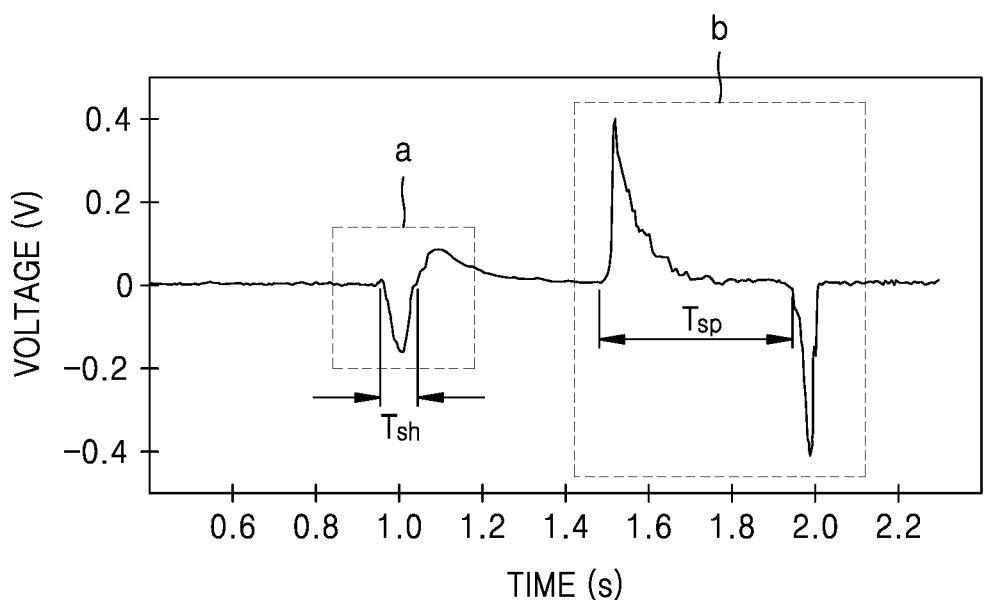
FIG. 5 is a graph for describing the method of FIG. 4.

FIG. 4 is a diagram showing a method of separating an obtained electric signal into a pressure signal and a heat signal according to an embodiment, and FIG. 5 is a graph for describing the method of FIG. 4.

Referring to FIGS. 4 and 5, an operation for separating an obtained electric signal into a pressure signal and a heat signal (operation S200) may include determining whether the value of a received electric signal is equal to or greater than zero. This may be a method corresponding to the case where a material included in the sensor unit 100 (FIG. 1) exhibits both the piezoelectric characteristic and the pyroelectric characteristic.

As described above, in the case of a material exhibiting both the piezoelectric characteristic and the pyroelectric characteristic, an electric signal in a positive (+) direction is obtained when pressure is applied and an electric signal in a negative (−) direction is obtained when heat is applied. Here, the positive (+) direction and negative (−) direction vary according to the reference direction of a current measuring device or a voltage measuring device. When an electric signal due to pressure is set as a negative (−) signal, an electric signal due to heat may have a positive (+) value.

According to an embodiment, when a received electric signal value satisfies the condition of being equal to 0 or greater (YES), the electric signal may be classified as a "pressure signal". When the condition is not satisfied (NO), the electric signal may be classified as a "heat signal". In this case, when the value of an electric signal is "0", no signal is generated, and thus a conditional expression may be set to exclude "0". However, since the generation of pain data is not affected by the case, it is not necessary to exclude the case where the value of an electric signal is "0".

FIG. 5 is a diagram showing an electric signal obtained by the sensor unit 100 according to an embodiment, wherein voltages V are measured with respect to the time s. Here, a voltage signal of a very small level fluctuating nearby zero voltage corresponds to noise inevitably generated during signal measurement, and such noise will be ignored in the descriptions of the signal processing operations below.

An electrical (voltage) signal is obtained when a value on the horizontal axis is at a time point around about 1.0 second, and the value of the electrical (voltage) signal may be a negative value. In other words, while voltage is zero, signal values decrease in the negative direction at a predetermined response speed and may return to a zero signal value after passing through a point corresponding to the maximum signal intensity, that is, the largest absolute signal value. In other words, electric signal values included in a box a may be classified as heat signals according to operation S200 of FIG. 4. Here, there are signal values increasing in the positive (+) direction after zero, which may correspond to signals corresponding to a time point at which heat applied to the sensor unit 100 is removed. In other words, it may be confirmed that heat duration Tsh during which heat is applied to the sensor unit 100 is about 0.1 seconds.

An electric signal is obtained again when a value on the horizontal axis is at a time point around about 1.5 seconds, wherein the value of the electric signal value may be a positive value. In other words, electric signal values included in a box b may be classified as pressure signals according to operation S200 of FIG. 4. As described above, an electric signal due to the piezoelectric effect is generated only at a moment when the pressure is applied or removed, and a signal having a negative value may be obtained at a time point when pressure is removed, that is, a time point around 2.0 seconds in the graph. In other words, it may be confirmed that pressure duration Tsp during which pressure is applied to the sensor unit 100 is about 0.5 seconds.

The method of separating a pressure signal and a heat signal is merely an example, and another method of separating a pressure signal and a heat signal will be described below.

Figure 6:
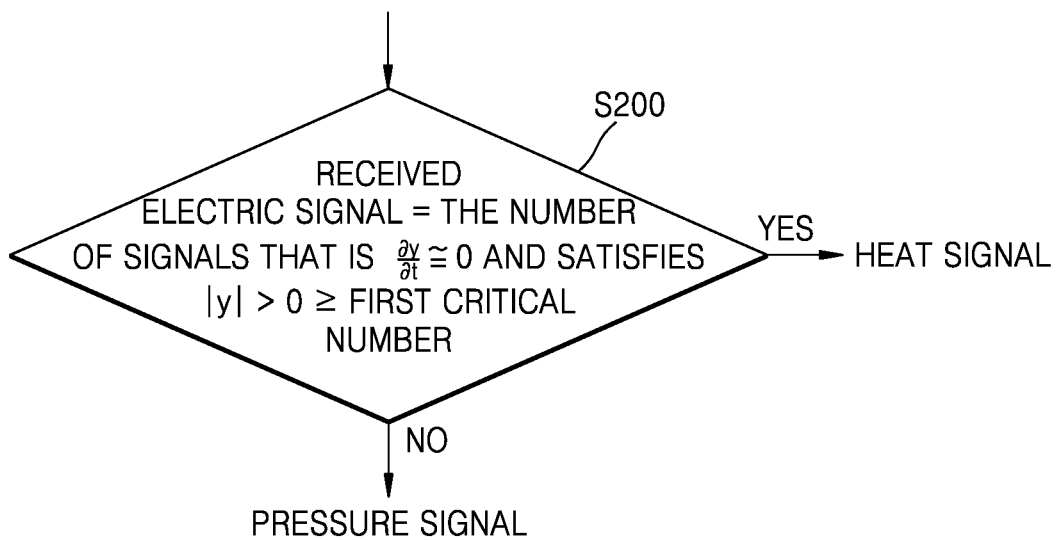
FIG. 6 is a diagram showing a method of separating an obtained electric signal into a pressure signal and a heat signal according to an embodiment.
Figure 7:
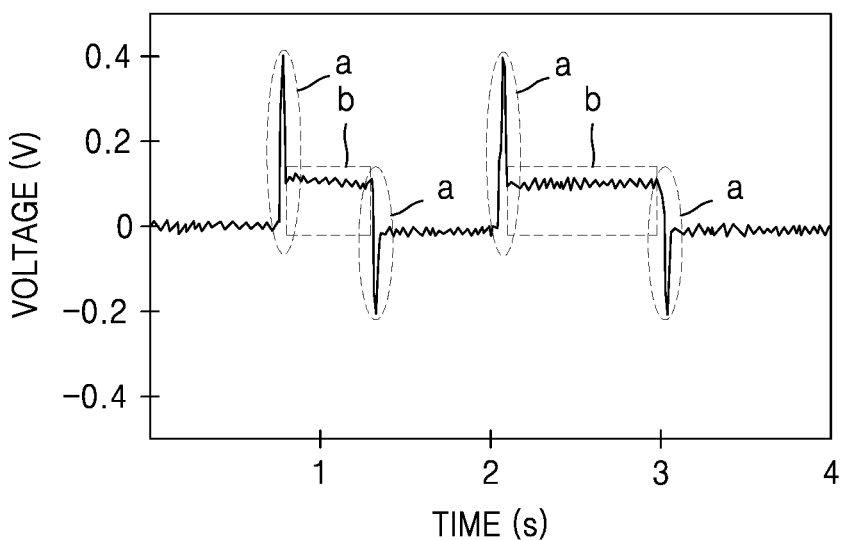
FIG. 7 is a graph for describing the method of FIG. 6.

FIG. 6 is a diagram showing a method of separating an obtained electric signal into a pressure signal and a heat signal according to an embodiment, and FIG. 7 is a graph for describing the method of method of FIG. 6.

Referring to FIGS. 6 and 7, the operation for separating an obtained electric signal into a pressure signal and a heat signal (operation S200) may include an operation for determining whether the number of signals satisfying a condition that a differential of a received electric signal y is zero and the intensity |y| of the electric signal is greater than zero is equal to or greater than a first critical number. This may be a method corresponding to the case where a material included in the sensor unit 100 (FIG. 1) exhibits both the piezoelectric characteristic and the Seeback characteristic.

As described above, in the case of a material exhibiting both the piezoelectric characteristic and the Seeback characteristic, an electric signal graph having a peak at a moment when pressure is applied is obtained, and, when heat is applied, electric signals having a predetermined intensity may be continuously obtained while the heat is being applied. For example, an electric signal obtained due to pressure may have has a triangular shape, whereas an electric signal obtained due to heat may have a rectangular shape.

Based on the shape of the graph, a conditional expression for classifying pressure signals and heat signals may be set in various ways. FIG. 6 shows one example thereof, which is a method of separating pressure signals and heat signals based on whether differential values of electric signals have values greater than a first critical number.

In other words, the number of pressure signals satisfying the condition that the differential values of electric signals are zero may be significantly smaller than the number of heat signals satisfying the same condition (□ OK), and pressure signals and heat signals may be classified according to the conditional expression shown in FIG. 6. The first critical number may be a value set and stored in the storage unit 300 (FIG. 1) in advance by a user and may be determined based on the number of points for performing differentiation.

As a result, a received electric signal y may be classified into a heat signal when the number of signals satisfying a condition that a differential of the received electric signal y is zero and the intensity |y| of the received electric signal y is greater than zero is equal to or greater than the first critical number (YES). When the condition is not satisfied (NO), the received electric signal y may be classified into a pressure signal.

FIG. 7 is a diagram showing an electric signal obtained by the sensor unit 100 according to an embodiment, wherein voltages V are measured with respect to the time s.

An electric (voltage) signal is obtained when a value on the horizontal axis is at a time point around about 0.8 seconds and, for example, in the case of performing differentiation around 0.8 seconds at the interval of 0.01 seconds, the number of signals satisfying a condition that a differential of the received electric signal y is zero and the intensity |y| of the received electric signal y is greater than zero may be from one to several. For example, when the first critical number is 100, the number of signals satisfying the above condition is less than 100, and thus the electric signal may be classified as a "pressure signal".

It may be seen that a signal obtained at a time point when the pressure is applied and a signal obtained at a time point when the pressure is released are obtained as a pair and the pressure is released at about 0.5 seconds.

Referring to FIG. 7, an electric signal having a flat-top shape may be generated after an electric signal having a pointed shape and, when the electric signal is differentiated at a predetermined interval, the number of signals satisfying a condition that a differential of the electric signal is zero and the intensity of the electric signal y is not zero may be from hundreds to thousands. Of course, the number of such signals may vary depending on the number of points for performing differentiation. In other words, in this case, the conditional expression of FIG. 6 is satisfied, and thus the electric signal may be classified as a heat signal. According to the separation method, electric signals in the box a may be classified into pressure signals and electric signals in the box b may be classified into heat signals, and then operations for determining whether to generate pain data may be performed thereto.

The method shown in FIGS. 6 and 7 is merely an example, and a pressure signal and a heat signal may be separated by introducing various conditional expressions when the shape of the pressure signal is different from that of the heat signal. For example, a pressure signal and a heat signal may be separated by comparing the width of an electric signal with a reference value or whether a positive (+) signal and a negative (negative) signal are generated as a pair.

Figure 8:
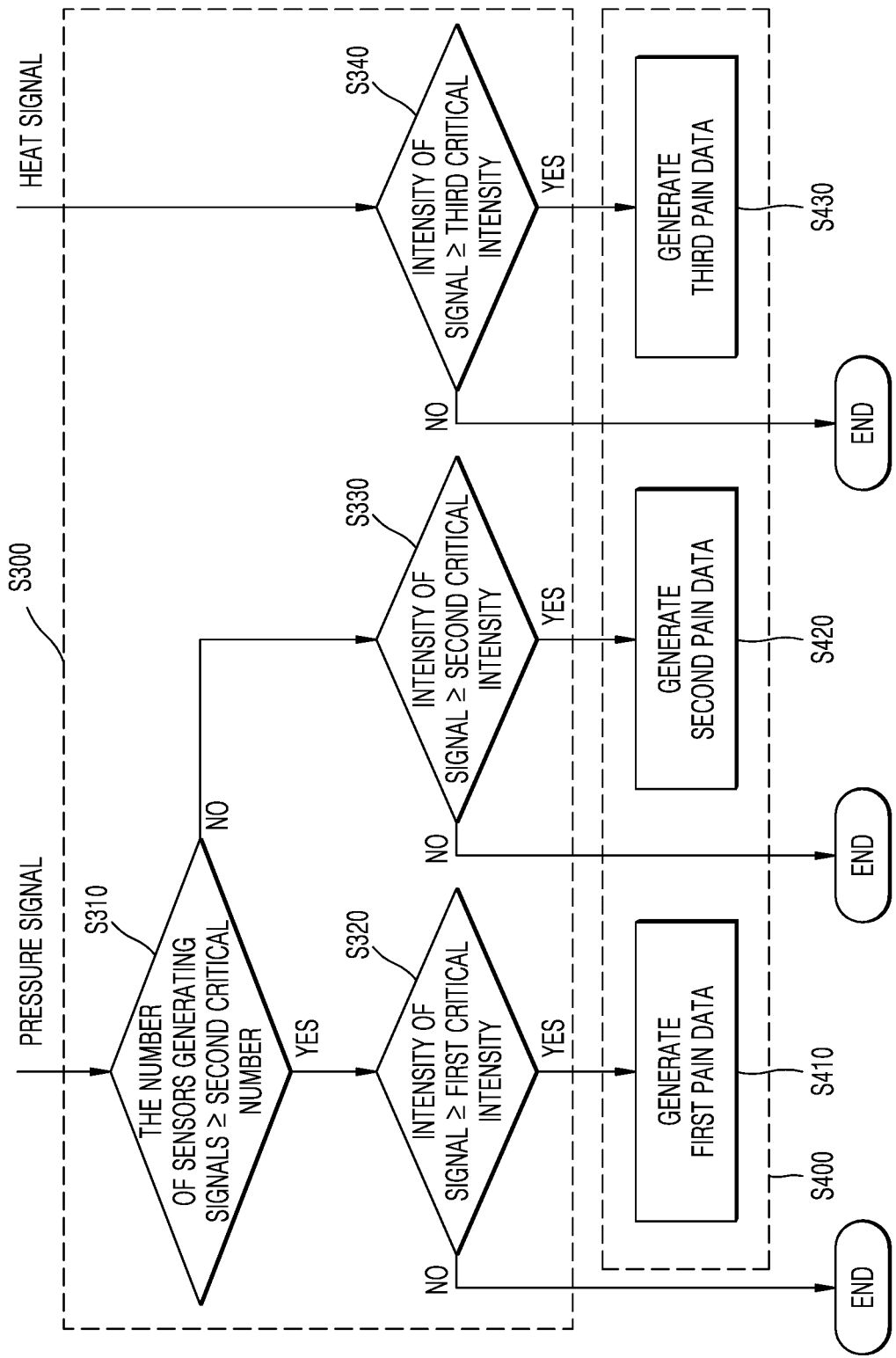
FIG. 8 is a flowchart showing an operation for determining whether to generate pain data and an operation for generating pain data according to an embodiment.

FIG. 8 is a flowchart showing an operation for determining whether to generate pain data and an operation for generating pain data according to an embodiment, and FIGS. 9A to 9F are diagrams for describing the operation for determining whether to generate pain data of FIG. 8.

Referring to FIG. 8, an operation for determining whether to generate pain data according to an embodiment (operation S300) may include an operation for determining whether the number of sensors $S_{unit}$ (FIG. 3) generating signals is less than or equal to a second critical number when a pressure signal is separated in operation S200 (operation S310), an operation for determining whether the intensity of the pressure signal is equal to or higher than a first critical intensity when the number of the sensors $S_{unit}$ is less than or equal to the second critical number (YES) (operation S320), and an operation for determining whether the intensity of the pressure signal is higher than a second critical intensity when the number of the sensors $S_{unit}$ is neither less than nor equal to the second critical number (NO) (operation S330). The first critical intensity and the second critical intensity may be values determined in advance and stored in the storage unit 300 (FIG. 1) by the user in consideration of materials included in the sensors $S_{unit}$ and the purpose of an electronic device for detecting pain.

Here, the second critical intensity may be higher than the first critical intensity. In other words, when the number of sensors $S_{unit}$ generating signals is small, pain data may be generated even with the pressure of low intensity. When the number of the sensors $S_{unit}$ generating signals is large, pain data may be generated with the pressure of relatively high intensity.

In operation S310, the number of sensors $S_{unit}$ generating signals is compared with the second critical number, and the operation may correspond to an operation for predicting the shape of an object that applies pressure. When pressure is applied by a pointed object, even when the intensity of the pressure is small, an area to which the pressure is applied is small, and thus a person feels a sharp pain. In other words, the smaller the number of sensors $S_{unit}$ generating signals is, the smaller the area that pressure is applied to the sensor unit 100 is. In this case, even when the intensity of the pressure is small, pain data may be generated.

When the number of sensors $S_{unit}$ generating signals is greater than the second critical number, the pressure is applied to a relatively large area, and thus it may be recognized that the pressure is applied by a blunt object rather than a pointed object. In this case, pain data may be generated only when the intensity of the pressure Is relatively high. For example, even when a stimulus is given by a blunt object like a fist, a person may feel pain when the intensity of the stimulus is very high. According to an embodiment, pain data may also be generated in such a case. Therefore, the second critical intensity is higher than the first critical intensity, and the greater the second critical number is, the higher the second critical intensity may be.

The second critical number may be determined by the interval P (FIG. 3) of the sensors $S_{unit}$ included in the sensor unit 100. For example, when the interval P is about 1 mm, the second critical number may be set to "1". When the interval P is less than 1 mm, the second critical number may have a value greater than 1, and the interval P may be determined in consideration of the ease of fabrication of the sensor unit 100 and the precision of the sensor unit 100.

The operation for determining whether to generate pain data according to an embodiment (operation S300) may further include, when a heat signal is separated in operation S200, determining whether the intensity of heat signal is greater than a third critical intensity (operation S340). Here, the third critical intensity may be a value determined in advance and stored in the storage unit 300 (FIG. 1) by the user in consideration of materials included in the sensors $S_{unit}$ and the purpose of an electronic device for detecting pain. For example, the third critical intensity may be lower than the first critical intensity and the second critical intensity.

The operation for generating pain data according to an embodiment (operation S400) may be performed when it is determined to generate pain data in operation S300. When it is determined to not to generate pain data in operation S300, the pain detection method may be terminated. Specifically, when it is determined to generate pain data in operation S310 and operation S320, an operation for generating first pain data (operation S410) may be performed. When it is determined to generate pain data in operation S310 and operation S330, an operation for generating second pain data may be performed (operation S420). When it is determined to generate pain data in operation S340, an operation for generating third pain data may be performed (operation S430). In other words, the operation for generating pain data (operation S400) may include generating at least one of first to third pain data.

As described above, the first pain data and the second pain data correspond to pain caused by pressure, and the third pain data correspond to pain caused by heat (that is, a high temperature). The first pain data may correspond to a pain that occurs when an area under pressure is small and the pressure equal to or higher than the first critical intensity is applied, that is, the pain corresponding to a stabbing. Meanwhile, the second pain data may correspond to a pain that occurs when an area under pressure is relatively large and pressure equal to or higher than the second critical intensity, which is higher than the first critical intensity, is applied, that is, the pain corresponding to a bruise.

Referring back to FIG. 2, the operation for outputting generated pain data (operation S500) may be performed after the operation for generating pain data (operation S400). At this time, output data corresponding to the first pain data, the second pain data, and the third pain data may be different from one another.

FIGS. 9A to 9F are graphs exemplifying separated pressure signals and heat signals. Hereinafter, a method of comparing electric signals and determining whether to generate pain data by using these electric signals will be described. An electric signal obtained by the sensor unit 100 (FIG. 1) may be a mixture of an electric signal due to pressure and an electric signal due to heat as shown in the graph of FIG. 5 and the graph of FIG. 7, but a pressure signal and a heat signal may be separated from each other through an operation for separating the same. Signals shown in FIGS. 9A to 9D may be separated pressure signals, and signals shown in FIGS. 9E and 9F may be separated heat signals.

Figure 9A:
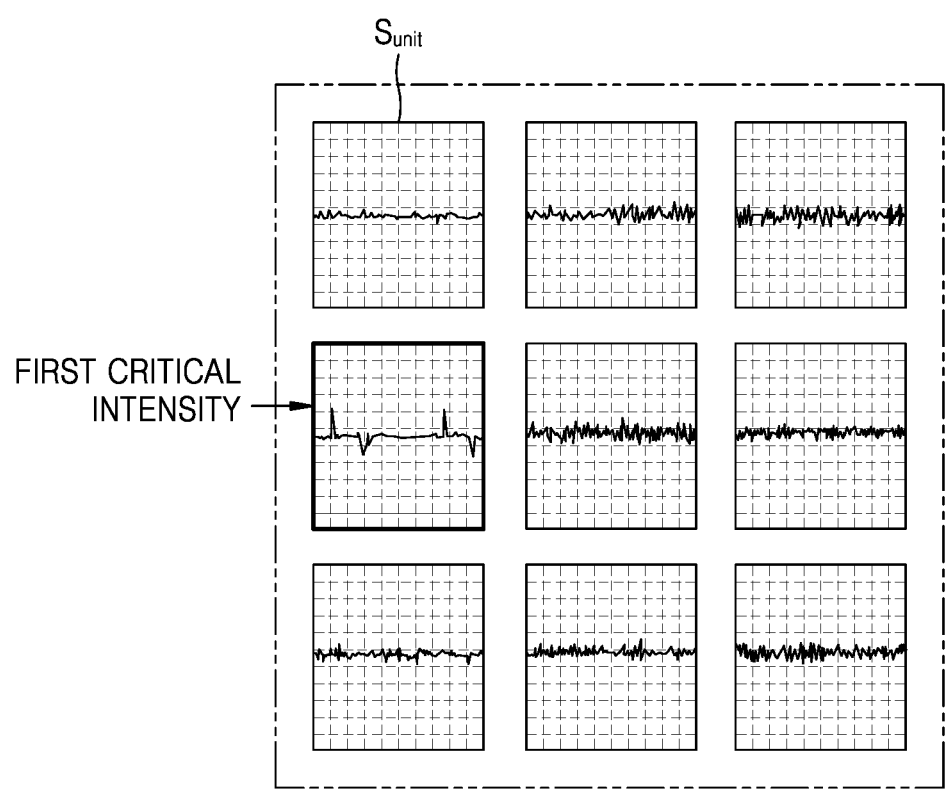
FIG. 9A is a diagram for describing an operation for determining whether to generate pain data according to the method of FIG. 8.
Figure 9B:
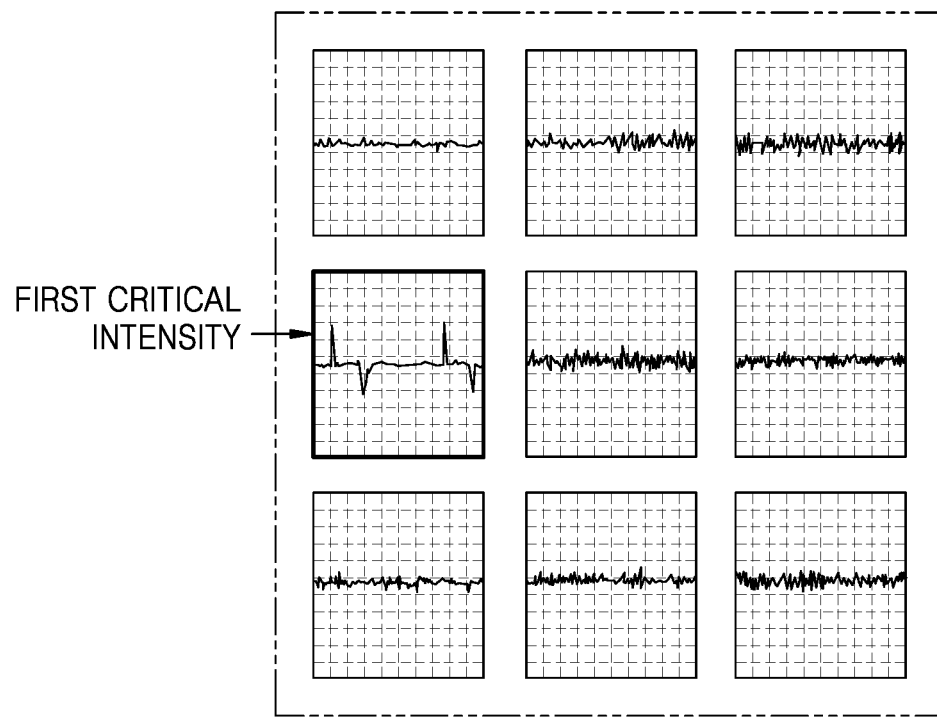
FIG. 9B is a diagram for describing an operation for determining whether to generate pain data according to the method of FIG. 8.
Figure 9C:
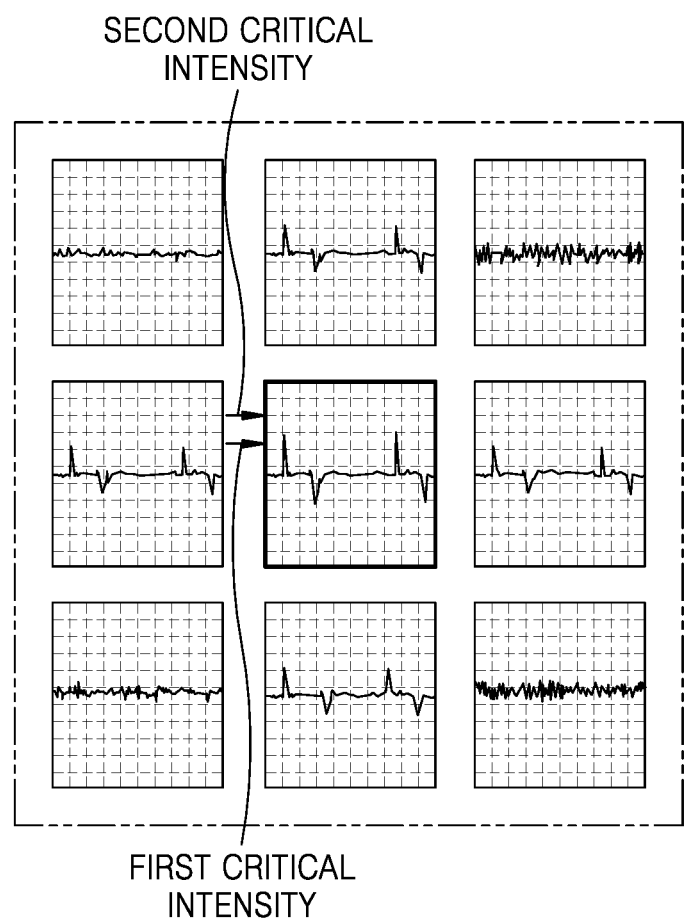
FIG. 9C is a diagram for describing an operation for determining whether to generate pain data according to the method of FIG. 8.
Figure 9D:
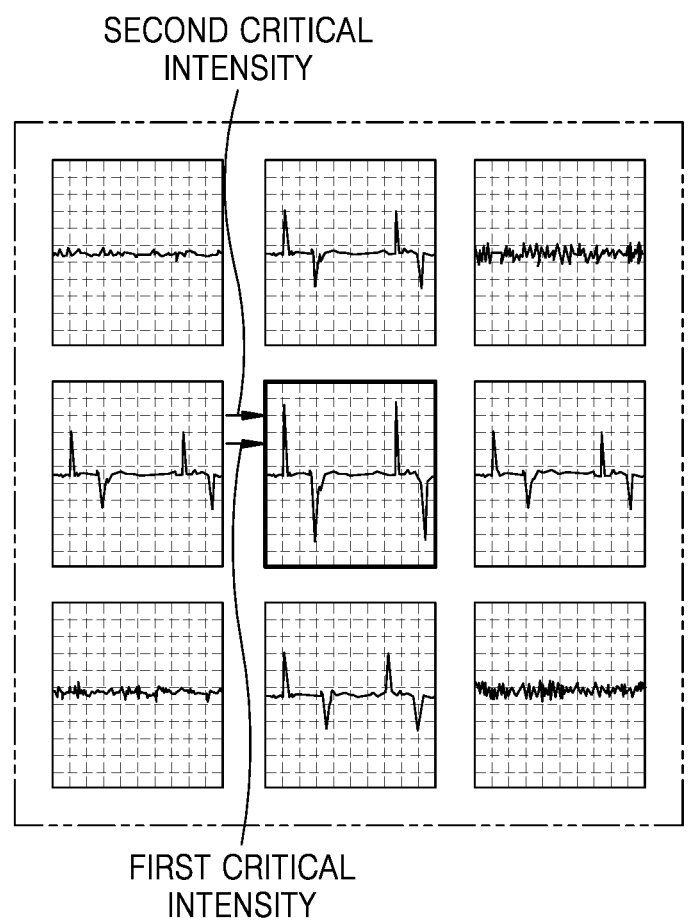
FIG. 9D is a diagram for describing an operation for determining whether to generate pain data according to the method of FIG. 8.
Figure 9E:
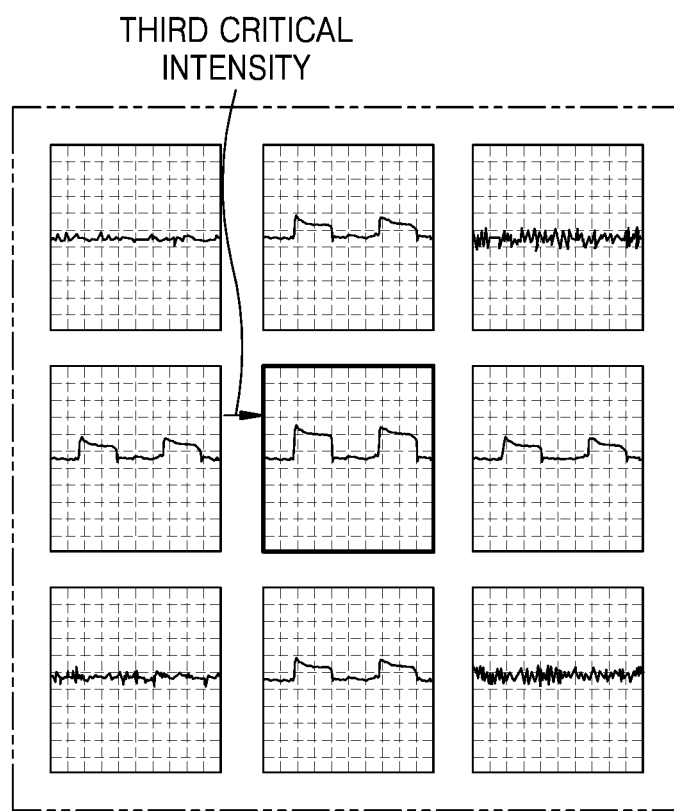
FIG. 9E is a diagram for describing an operation for determining whether to generate pain data according to the method of FIG. 8.
Figure 9F:
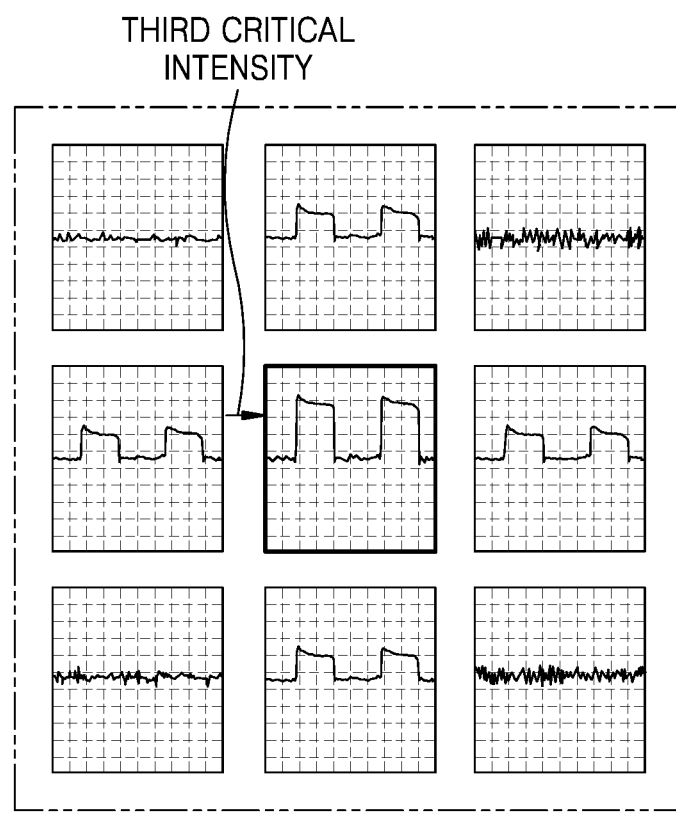
FIG. 9F is a diagram for describing an operation for determining whether to generate pain data according to the method of FIG. 8.

FIGS. 9A and 9F show six sensors $S_{unit}$ disposed adjacent to one another in a region where pressure and/or heat is applied, and the sensor unit 100 may include more than six sensors. Also, the generation of a signal below indicates that an effective electric signal is generated rather than a noise signal, and signals corresponding to noise may be actually removed by hardware and/or software.

Referring to FIGS. 9A and 9B, the number of sensors $S_{unit}$ generating signals from among the plurality of sensors $S_{unit}$ included in the sensor unit 100 is 1. For example, when the first critical number is 1, the condition in operation S310 of FIG. 8 is satisfied, and thus operation S320 may be performed. In operation S320, since the intensity of the signal is smaller than the first critical intensity in FIG. 9A, it may be determined to not to generate pain data and the operation may be terminated.

In operation S320, since the intensity of the signal is equal to or higher than the first critical intensity in FIG. 9A, it may be determined to generate pain data, and first pain data may be generated in operation S410. The first pain data may be pain data corresponding to stabbing.

Referring to FIGS. 9C and 9D, the number of sensors $S_{unit}$ generating signals from among the plurality of sensors $S_{unit}$ included in the sensor unit 100 is 5. For example, when the first critical number is 1, the condition in operation S310 of FIG. 8 is not satisfied, and thus operation S330 may be performed. In operation S330, since the intensity of the signal is smaller than the second critical intensity in FIG. 9C, it may be determined to not to generate pain data and the operation may be terminated.

In operation S330, since the intensity of the signal is equal to or higher than the second critical intensity in FIG. 9D, it may be determined to generate pain data, and second pain data may be generated in operation S420. The first pain data may be pain data corresponding to bruise.

Referring to FIGS. 9E and 9F, regardless of the number of sensors generating signals from among the plurality of sensors $S_{unit}$ included in the sensor unit 100, when the intensity of a heat signal obtained by at least one sensor $S_{unit}$ from among the sensors $S_{unit}$ generating signals is equal to or higher than a third critical intensity, it may be determined to generate pain data. In other words, although FIGS. 9E and 9F show the case where the number of the sensors $S_{unit}$ generating signals is five, operation S340 may be performed even when the number of the sensors $S_{unit}$ generating signals is one.

In operation S340, since the intensity of the signal is smaller than the third critical intensity in FIG. 9E, it may be determined to not to generate pain data and the operation may be terminated. In operation S340, since the intensity of the signal is equal to or higher than the third critical intensity in FIG. 9F, it may be determined to generate pain data, and third pain data may be generated in operation S430. The third pain data may be pain data corresponding to high temperature.

Figure 10:
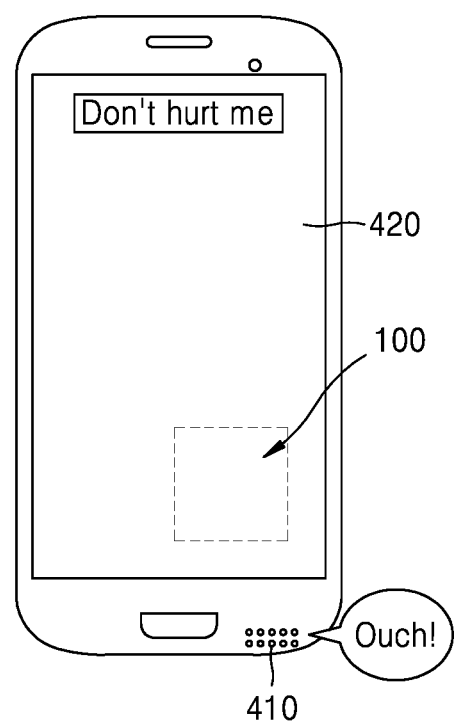
FIG. 10 is a diagram for describing electronic devices according to embodiments.
Figure 11:
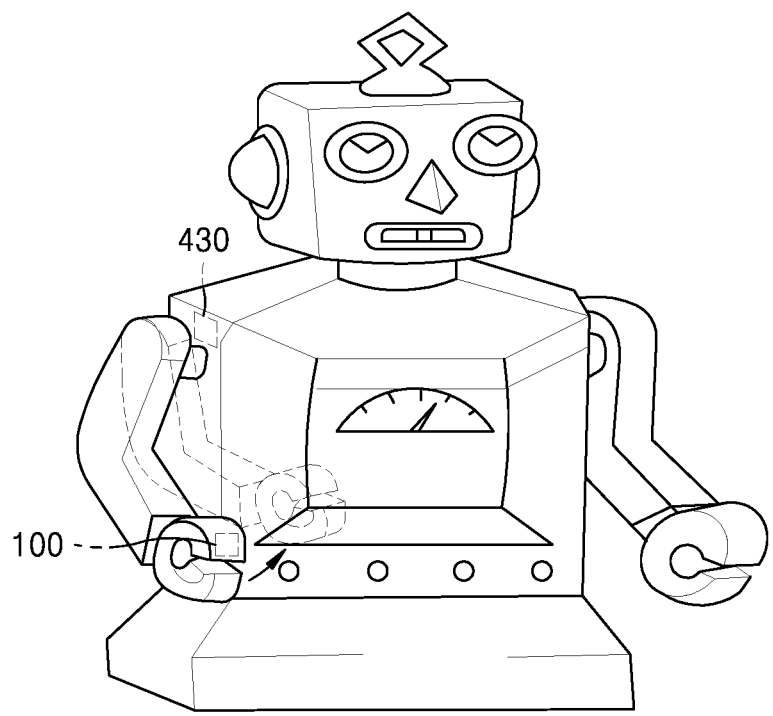
FIG. 11 is a diagram for describing electronic devices according to embodiments.

FIGS. 10 and 11 are diagrams for describing electronic devices according to embodiments.

FIG. 10 shows a case where the electronic device is a mobile phone, and the sensor unit 100 may be incorporated in at least a portion of the mobile phone. When pressure and heat are applied to the sensor unit 100, the control unit 200 (FIG. 2) may generate pain data by executing predetermined operations, and the pain data may be output via an audio output unit 410 and/or through a display unit 420 included in the mobile phone. Although not shown, a mobile phone may include a driving motor that vibrates the mobile phone, and when pain data is generated, the driving motor may be activated to vibrate the mobile phone.

FIG. 11 shows a case where the electronic device is a robot, and the robot may include the sensor unit 100 that is incorporated in at least a portion of the robot, e.g., a finger unit. When pressure and/or heat are applied to the sensor unit 100, the control unit 200 (FIG. 2) may generate pain data by executing predetermined operations, and the pain data may be output via a driving motor 430 included in the robot. In other words, the driving motor 430 may be operated to move an arm, thereby performing a motion for escaping from pain. Although not shown, the robot may further include an audio output unit and/or a display unit and output pain data through the same.

As described above, the first, second, and third pain data of different types may be converted into different output data, or different output data may be transmitted from the storage unit 300 (FIG. 1) and output via the output unit 400.

According to embodiments of the present disclosure as described above, a pain detection method capable of measuring "pain caused by pressure" and "pain caused by heat" simultaneously via one sensor unit 100 by using physical characteristics of the sensor unit 100 and electronic devices for detecting pain may be provided. In addition, electronic devices capable of interacting with the human by detecting pain and protecting themselves in response to the pain may be implemented.

The method according to an embodiment of the present disclosure may be implemented in the form of a program command that may be executed through various computer means and recorded in a computer-readable medium. The computer-readable medium may include program instructions, data files, data structures, and the like, alone or in combination. The program commands recorded on the medium may be specially designed and configured for example embodiments or may be published and available to one of ordinary skill in computer software. Examples of the computer-readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, ROM, RAM, a flash memory, and the like. Examples of program commands include machine language code such as code generated by a compiler, as well as high-level language code that may be executed by a computer using an interpreter or the like.

While one or more embodiments have been described with reference to the figures, it will be understood by those of ordinary skill in the art that various changes in form and details may be made therein without departing from the spirit and scope as defined by the following claims.

INDUSTRIAL APPLICABILITY

At least one of embodiments of the present disclosure may be applied to a pain detection method for detecting pain caused by external stimuli and an electronic device for detecting pain.

The invention claimed is:

1. A pain detecting method comprising:
obtaining an electric signal from applied pressure and heat by using a sensor unit comprising a material exhibiting both a piezoelectric characteristic and a thermoelectric characteristic;
separating a pressure signal generated by the pressure and a heat signal generated by the heat from the obtained electric signal;
determining whether to generate pain data from each of the pressure signal and the heat signal; and
outputting the pain data.

2. The pain detection method of claim 1, wherein the sensor unit is a sensor array comprising a plurality of sensors arranged in a matrix shape, and
the determining of whether to generate the pain data comprises:
determining whether to generate pain data based on the number of sensors generating signals from among the plurality of sensors and a intensity of the pressure signal; and
determining whether to generate pain data from the heat based on a intensity of the heat signal.

3. The pain detection method of claim 2, wherein, in the determining of whether to generate the pain data,
the pressure signal is determined as first pain data when the number of the sensors is equal to or less than a critical number and the intensity of the pressure signal is equal to or greater than a first critical intensity and the pressure signal is determined as second pain data when the number of the sensors exceeds the critical number and the intensity of the pressure signal is equal to or greater than a second critical intensity, and,
in the determining of whether to generate pain data from the heat,
the heat signal generated by at least one of the plurality of sensors is determined as third pain data when the heat signal is equal to or greater than a third critical intensity.

4. The pain detection method of claim 3, wherein the second critical intensity is greater than the first critical intensity.

5. The pain detection method of claim 3, wherein outputting the pain data comprises outputting the pain data via an output unit, wherein the output unit comprises at least one of a voice output unit, a display unit, or a driving motor and outputs at least one of the first pain data, the second pain data, or the third pain data.

6. The pain detection method of claim 2, wherein each of the plurality of sensors comprises a first electrode, a second electrode facing the first electrode, and an intermediate layer disposed between the first electrode and the second electrode, the intermediate layer comprising a material exhibiting both the piezoelectric characteristic and the thermoelectric characteristic.

7. The pain detection method of claim 6, wherein the material exhibiting both the piezoelectric characteristic and the thermoelectric characteristic is an insulating piezoelectric material comprising polyvinylidene fluoride (PVDF), barium titanate ($BaTiO_3$), lead zirconate titanate (PZT), lead titanate ($PbTiO_3$), strontium titanate ($SrTiO_3$).

8. The pain detection method of claim 7, wherein, in the separating of the pressure signal and the heat signal,
the obtained electric signal is classified into the pressure signal when the obtained electric signal is 0 or greater and is classified into the heat signal when the obtained electric signal is smaller than 0 or the obtained electric signal is classified into the pressure signal when the obtained electric signal is 0 or smaller and is classified into the heat signal when the obtained electric signal is greater than 0.

9. The pain detection method of claim 6, wherein the material exhibiting both the piezoelectric characteristic and the thermoelectric characteristic comprises a semiconductor piezoelectric material including conductive carriers, and the intermediate layer comprises a zinc oxide (ZnO) film or a zinc oxide nanowire.

10. The pain detection method of claim 9, wherein, in the separating of the pressure signal and the heat signal,
the electric signal is classified into a heat signal when the number of points at which the intensity of the electric signal is greater than 0 and differential values of the electric signal with respect to a time is 0 is equal to or greater than a first critical number, and is classified into a pressure signal when the number of points at which the intensity of the electric signal is greater than 0 and differential values of the electric signal with respect to the time is 0 is smaller than the first critical number.

11. An electronic device comprising:
a sensor unit comprising a material exhibiting a piezoelectric characteristic and a thermoelectric characteristic;
a control unit configured to generate pain data from an electric signal obtained from the sensor unit; and
an output unit configured to output the pain data,
wherein the control unit comprises:
a signal separating unit configured to separate a pressure signal generated by the pressure and a heat signal generated by the heat from the obtained electric signal;
a comparing and determining unit configured to determine whether to generate pain data from each of the pressure signal and the heat signal; and
a pain data generating unit configured to generate pain data.

12. The electronic device of claim 11, wherein the sensor unit is a sensor array comprising a plurality of sensors arranged in a matrix shape, and
the comparing and determining unit determines whether to generate pain data based on the number of sensors generating signals from among the plurality of sensors and an intensity of the pressure signal and determines whether to generate pain data from the heat based on an intensity of the heat signal.

13. The electronic device of claim 12, wherein the comparing and determining unit determines the pressure signal as first pain data when the number of the sensors is equal to or less than a critical number and the intensity of the pressure signal is equal to or greater than a first critical intensity, determines the pressure signal as second pain data when the number of the sensors exceeds the critical number and the intensity of the pressure signal is equal to or greater than a second critical intensity, and determines the heat signal generated by at least one of the plurality of sensors as third pain data when the heat signal is equal to or greater than a third critical intensity.

14. The electronic device of claim 13, wherein the second critical intensity is greater than the first critical intensity.

15. The electronic device of claim 13, wherein the output unit comprises at least one of a voice output unit, a display unit, and a driving motor and outputs at least one of the first pain data, the second pain data, and the third pain data.

16. The electronic device of claim 12, wherein each of the plurality of sensors comprises a first electrode, a second electrode facing the first electrode, and an intermediate layer disposed between the first electrode and the second electrode, the intermediate layer comprising a material exhibiting both the piezoelectric characteristic and the thermoelectric characteristic.

17. The electronic device of claim 16, wherein the material exhibiting both the piezoelectric characteristic and the thermoelectric characteristic is an insulating piezoelectric material comprising polyvinylidene fluoride (PVDF), barium titanate ($BaTiO_3$), lead zirconate titanate (PZT), lead titanate ($PbTiO_3$), strontium titanate ($SrTiO_3$).

18. The electronic device of claim 17, the separating and determining unit classifies the obtained electric signal into the pressure signal when the obtained electric signal is 0 or greater and classifies the obtained electric signal into the heat signal when the obtained electric signal is smaller than 0 or classifies the obtained electric signal into the pressure signal when the obtained electric signal is 0 or smaller and classifies the obtained electric signal into the heat signal when the obtained electric signal is greater than 0.

19. The electronic device of claim 16, wherein the material exhibiting both the piezoelectric characteristic and the thermoelectric characteristic comprises a semiconductor piezoelectric material including conductive carriers, and the intermediate layer comprises a zinc oxide (ZnO) film or a zinc oxide nanowire.

20. The electronic device of claim 19, wherein the separating and determining unit classifies the electric signal into a heat signal when the number of points at which the intensity of the electric signal is greater than 0 and differential values of the electric signal with respect to a time is 0 is equal to or greater than a first critical number and classifies the electric signal into a pressure signal when the number of points at which the intensity of the electric signal is greater than 0 and differential values of the electric signal with respect to the time is 0 is smaller than the first critical number.

* * * * *